Figure 1:
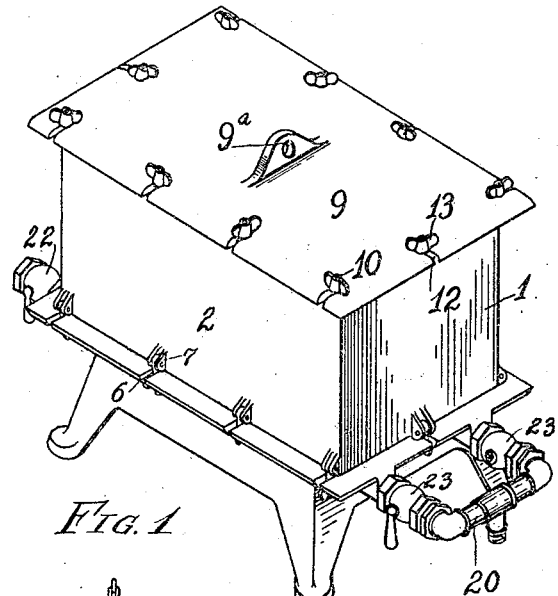

G. KNOCK.
FILTER.
APPLICATION FILED JULY 22, 1908.

956,366.

Patented Apr. 26, 1910.

3 SHEETS—SHEET 1.

WITNESSES:

INVENTOR,
George Knock
BY Oates, Fouts & Hull
ATTYS.

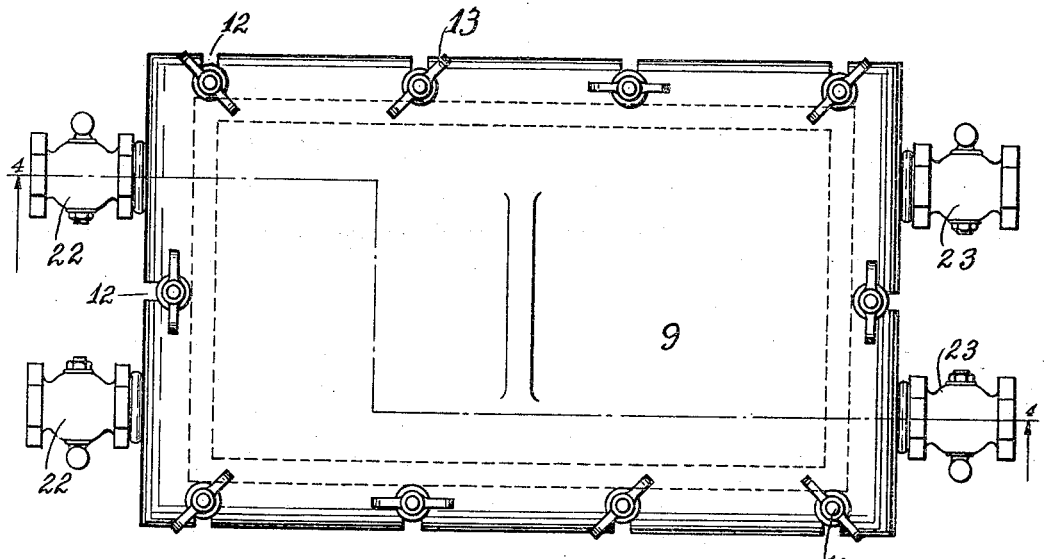
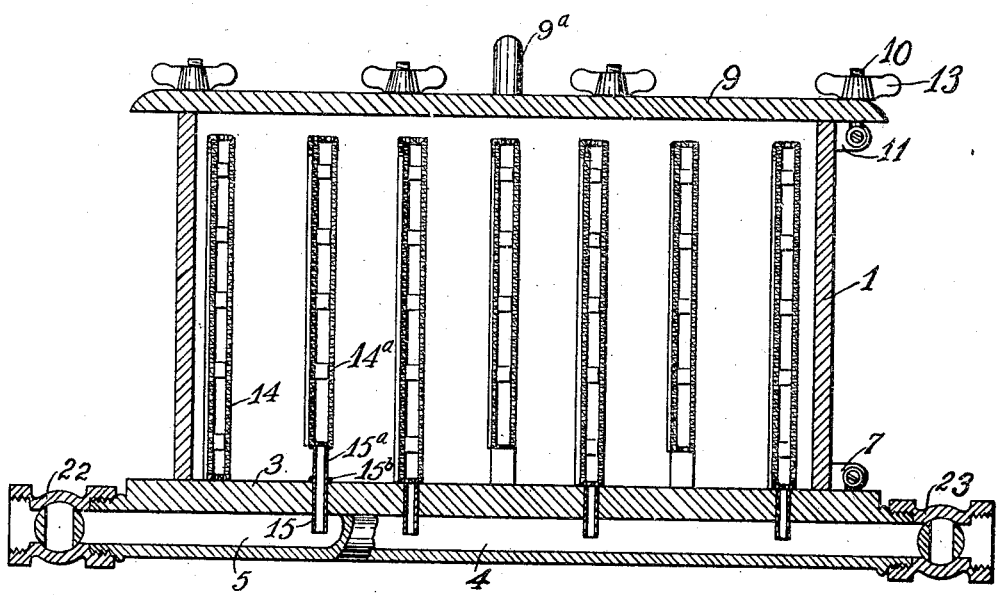

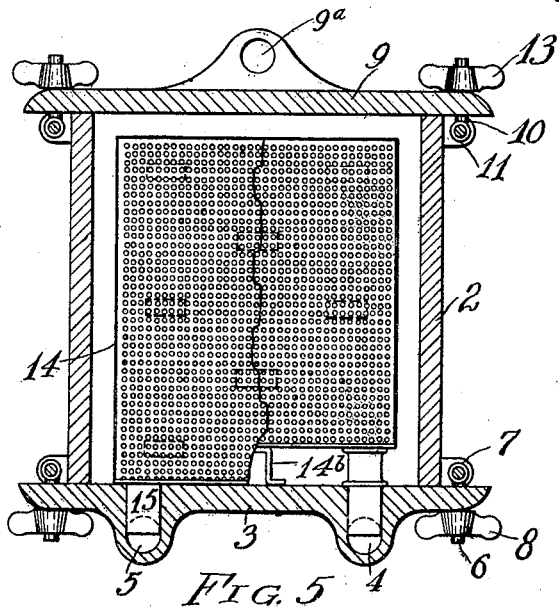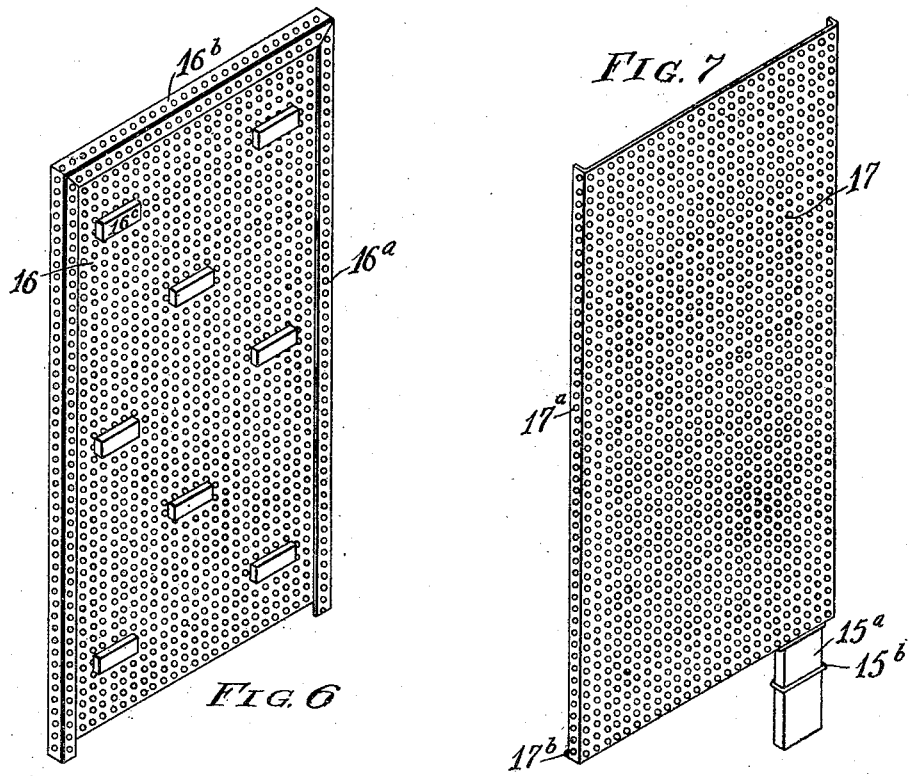

UNITED STATES PATENT OFFICE.

GEORGE KNOCK, OF CLEVELAND, OHIO.

FILTER.

956,366.  Specification of Letters Patent.  Patented Apr. 26, 1910.

Application filed July 22, 1908. Serial No. 444,699.

*To all whom it may concern:*

Be it known that I, GEORGE KNOCK, a citizen of the United States, residing at Cleveland, in the county of Cuyahoga and State of Ohio, have invented a certain new and useful Improvement in Filters, of which the following is a full, clear, and exact description, reference being had to the accompanying drawings.

This invention relates to filters and more particularly to filters which are used for liquids, such as beer.

The objects of the invention are to provide a filter which may be conveniently and efficiently packed with the filter mass and which shall be simple of construction, of relatively great filtering capacity in proportion to its size, and which is capable of being easily and thoroughly cleaned.

Generally speaking, the invention may be defined as consisting of the combinations of elements embodied in the claims hereto annexed and illustrated in the drawings forming part hereof, wherein—

Figure 2:
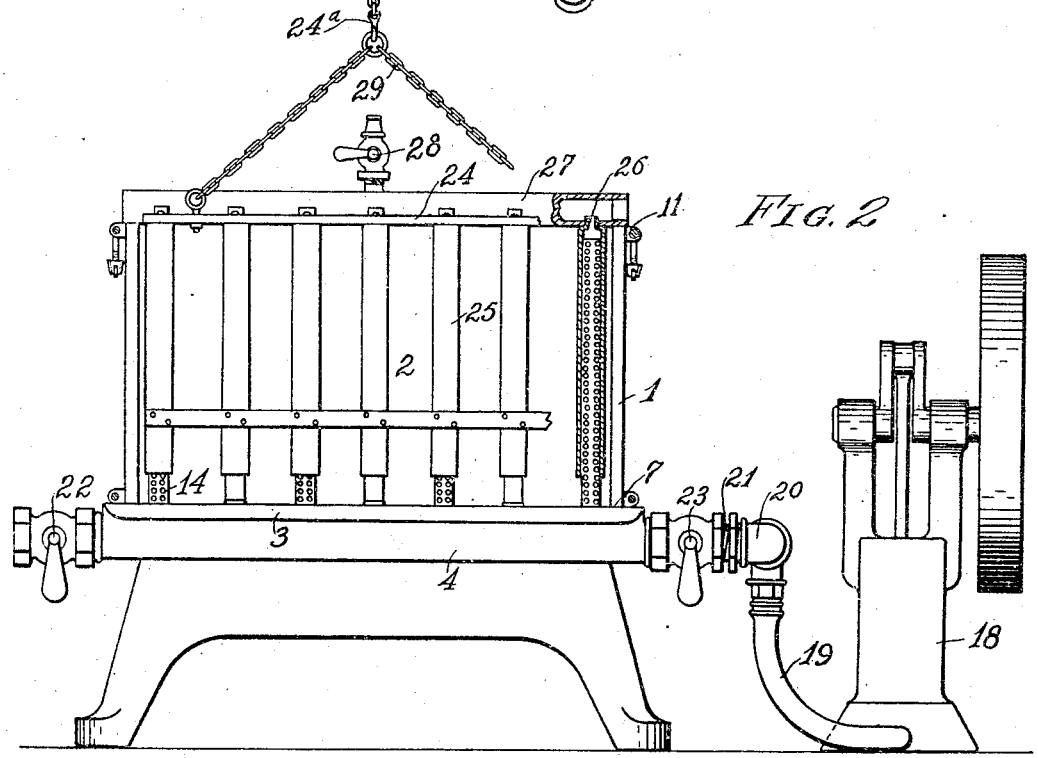

Figure 1 represents a perspective view of a filter constructed in accordance with my invention; Fig. 2 represents a side elevation of my filter, showing the attachments employed therewith in the process of packing the same, certain parts being broken away to illustrate the construction of the filter; Fig. 3 represents a top plan view of the filter, with the cover thereon; Fig. 4 represents a longitudinal sectional view through the filter shown in the preceding figure on the line 4—4 of said figure; Fig. 5 shows a transverse sectional view, with a part of one of the filter elements broken away; Figs. 6 and 7 are perspective views of the two plates composing one of the filter members.

The body of the filter is composed of a rectangular box having ends 1, sides 2 and bottom 3. This bottom is provided with a pair of pipes 4 and 5, which may be conveniently cast therewith, as shown in the drawings. The former pipe is the inlet pipe through which the beer or other liquid to be filtered is supplied to the filter and the latter is the outlet through which the beer is discharged from the filter.

To facilitate the removal of the filter mass after the filtering operation, the bottom 3 may be detachably supported from sides 2 by means of bolts 6 pivoted to lugs 7 on the sides and swinging into suitable recesses formed in the laterally projecting sides and ends of the bottom, each of said bolts being provided with a suitable wing nut 8. Similarly cover 9 may be applied to the sides by means of pivoted bolts 10 carried by lugs 11 and swinging upwardly into slots 12 in the sides and ends of the cover, each of said bolts being provided with a wing nut 13.

Each of the pipes 4 and 5 has connected thereto a number of perforated filter members 14 and 14$^a$ respectively. The members of both series are substantially identical in construction and, as will appear from Fig. 5, each member occupies substantially the entire transverse area of the filter box, sufficient space being provided between the top and sides of each member and the corresponding portions of the box for the reception of the filter mass, which, in the case of beer, is usually moist pulp. The members 14 are the "outlet" members and each is provided with a downwardly extending connecnection 15 which projects through the base 3 and into the outlet pipe 5. The bottom of each member 14 is in substantial contact with and may rest on the bottom of the filter box. Each member 14$^a$ is provided with a connection 15$^a$ extending into the inlet pipe 4. Members 14$^a$ are staggered with respect to members 14 and are supported with their bottoms above the bottom plate 3, whereby the liquid discharged through members 14$^a$ is forced to travel downwardly through the filter mass before reaching bottom plate 3. But for the provision of this space, some of the liquid might pass along the bottom plate 3 without being sufficiently filtered on its way to the outlet members 14. Each outlet connection 15$^a$ is provided with a collar 15$^b$ by which it and the superposed inlet element is supported in proper relation to the bottom plate 3. The tops of the outlet members 14 and inlet members 14$^a$ are in substantially the same horizontal plane.

Except for the comparatively slight difference in vertical extent, members 14 and 14$^a$ are identical in construction, and the construction of both sets of members will be apparent from Figs. 5, 6 and 7, the latter figure showing in detail one of the members 14$^a$.

Each filter member, whether inlet or outlet member, comprises a pair of perforated plates 16 and 17. Each of these plates is provided at its sides and at one end thereof with an angular perforated flange. The side flanges 16$^a$ of plate 16 are bent inwardly or toward each other to provide clamps for the corresponding side flanges 17ª of 17. Flanges 17ª provide edge spacers between plates 16 and 17 and are also perforated. The end flange 16ᵇ of plate 16 is at the top of the plate and is bent at right angles with the body of the plate and then downwardly to clamp the upper end of plate 17. The lower end of plate 17 is provided with an inwardly projecting flange 17ᵇ which engages the bottom of plate 16ᵇ and forms a closure therewith. To preserve the width of the space between plates 16 and 17 and enable them to withstand the pressure of the filter mass, suitable spacing lugs 16ᶜ are provided, which lugs may be carried by either or both plates,—in this case being shown as carried by plate 16. The inlet connection 15ª projects downwardly from flange 17ᵇ.

The outlet members 14 are constructed in the same manner as the inlet members, except that the bottoms of the outlet members are in substantial engagement with and preferably rest directly against the bottom 3 of the filter box. Each outlet connection 15 projects downwardly from the perforated flanged end of one of the plates of the member 14. Where connection 15ª is at one side of members 14ª, additional supports 14ᵇ may be provided for the lower ends of said members. By making the filter members of slidably connected plates, they can be very easily and thoroughly cleaned.

In Fig. 2, the filter box is shown as connected with a suction pump for applying suction to the filter mass. This pump 18 is detachably connected to pipes 4 and 5 by means of a flexible hose 19 and a Y-connection 20, the ends of said connection being detachably connected to the pipes by means of unions 21. Each pipe 4 and 5 is provided at its opposite ends with valves 22 and 23 respectively.

It has been found, in packing a filter by suction, that best results are secured when the suction is applied successively to relatively small portions of the mass. For this purpose, a frame 24 is provided for the top of the filter box, said frame being provided with a plurality of downwardly projecting hoods 25, each of said hoods being slightly larger than its coöperating member to be slipped thereover and being closed at the top except for a connection 26 which projects into a closed pipe 27 provided with a valve 28. The lower ends of the hoods are open and are preferably in the same plane, parallel with the base 3.

29 denotes a chain bridle or similar suspending device for the frame, by means of which it may be vertically adjusted, as by a pulley hook 24ª.

In packing the filter with the frame, hoods and pump described, the frame is first lowered until it rests upon the top of the box, in which position the lower ends of the hoods are a short distance above the bottoms of the outlet members 14. The filter mass is then inserted through the open-work top of the frame to the interior of the tank until the tank is filled, sealing the lower ends of the hoods. The pump 18 is then started and the suction exercised thereby packs the filter mass uniformly throughout the bottom portion of the filter tank. When this layer of pulp has been packed, valve 28 is opened, breaking the vacuum within hoods 25, and frame 24 is elevated a short distance, say some two inches. Valve 28 is closed, and the suction exercised by the pump through the exposed mass-covered perforations in the filter member packs the filter mass adjacent thereto closely and uniformly around the various filter members and throughout the horizontal area of the filter tank. In similar manner, successive layers of filter mass are packed until the tank is full of compact and uniformly distributed filter mass. After frame 24 is removed, the cover 9 is applied. For convenience of operation, the cover is provided with an eye 9ª to which the hook of a block may be applied.

Having thus described my invention, I claim:

1. In a filter, the combination of a body having a base, perforated outlet members carried thereby, a pipe or conduit with which said members communicate, a frame, a plurality of hoods carried by said frame and having their ends remote from said frame open, means for applying suction to said conduit or pipe, and means for adjusting said frame, substantially as specified.

2. In a filter, the combination of a hollow body, one wall whereof is provided with a plurality of perforated filter members, of a conduit communicating with said members, a suction device connected to said conduit, a plurality of hoods, one for each of said members, a frame carrying said hoods, and means for adjusting said frame, substantially as specified.

3. In a filter, the combination of a perforated filter member, means for applying suction thereto, a hood adapted to cover said member more or less, and means for adjusting said hood along said member, substantially as specified.

4. In a filter, the combination of a perforated filter member, a suction device connected thereto, and means for exposing different portions of said member successively to the action of said suction device, substantially as specified.

5. In a filter, the combination of a plurality of perforated members, a suction device common to all of said members and connected thereto, and means for exposing successive perforated areas of said members to the action of said suction device, substantially as specified.

6. In a filter, the combination of a perforated filter member, a suction device connected thereto, a covering hood for the filter member, means for adjusting said hood along said member, and a valved connection communicating with said hood, substantially as specified.

7. In a filter, the combination of a perforated filter member, a suction device connected thereto, a covering member or hood for the filter member, means for adjusting said covering member or hood, and means whereby the vacuum within said hood may be broken, substantially as specified.

8. In a filter, the combination of a plurality of perforated filter members, a suction device common thereto and connected therewith, a frame, a plurality of hoods carried thereby and adapted to receive said perforated members, a pipe common to all of said hoods, and a valve in said pipe, substantially as specified.

9. In a filter, the combination of a base having inlet and outlet pipes applied thereto, a plurality of perforated filter members projecting from said base and communicating with the inlet pipe, a plurality of perforated filter members also projecting from said base and communicating with the outlet pipe, valves for said pipes, a suction device connected to both of said pipes, a frame, a plurality of hoods carried thereby and adapted to cover said filter members, means for adjusting said frame, a pipe common to all of said hoods, and a valve in said pipe, substantially as specified.

10. In a filter, the combination of a base, inlet and outlet pipes, a plurality of perforated filter members projecting from said base and communicating with the inlet pipe, a plurality of perforated filter members also projecting from said base and communicating with the outlet pipe, a suction device connected to said pipes, a frame, a plurality of hoods carried thereby and adapted to cover said filter members, and means for adjusting said frame, substantially as specified.

11. In a filter, the combination of a base having a plurality of perforated filter members projecting therefrom, each of said members being of substantially uniform cross section from end to end thereof, a suction device connected to all of said members, a frame, a plurality of hoods projecting therefrom and adapted to inclose said members and each being of substantially uniform cross section from end to end thereof, a pipe connected to all of said hoods, a valve in said pipe, and means for adjusting said frame, substantially as specified.

12. In a filter, the combination of a base having a plurality of perforated filter members projecting therefrom, each of said members being of substantially uniform cross section from end to end thereof, a suction device connected to all of said members, a frame, a plurality of hoods projecting therefrom and adapted to inclose said members and each being of substantially uniform cross section from end to end thereof, and means for adjusting said frame, substantially as specified.

13. In a filter, the combination of a base provided with an inlet pipe and with an outlet pipe, a plurality of perforated filter members communicating with the inlet pipe and having their bottoms in substantial contact with said base, and a plurality of perforated filter members communicating with the inlet pipe and each having its bottom elevated above said base, substantially as specified.

14. A filter member comprising a pair of perforated plates slidable with respect to each other and forming a chamber therebetween, one of said plates being provided with a connection, substantially as specified.

15. A filter member comprising a perforated plate having its opposite sides provided with flanges, a second plate slidably fitted between said flanges and a connection carried by one of said plates, substantially as specified.

16. A filter member comprising a perforated plate having its opposite sides and one end provided with flanges, a second plate slidably fitted between said flanges and having flanges at its sides and at one end, a connection carried by the flanged end of one of said plates, and means for spacing said plates apart, substantially as specified.

17. In a filter, the combination of a base provided with a pipe, and a plurality of filter members projecting from said base, each of said members comprising a pair of spaced perforated plates forming with each other a receptacle and slidably connected, one of said plates being provided with a connection communicating with said pipe, substantially as specified.

18. In a filter, the combination of a base provided with a liquid pipe or conduit, a plurality of filter members projecting vertically from said base and each comprising a pair of perforated plates slidably connected at their side edges, one of said plates being provided at its bottom with a perforated flange, and tubular connections extending between said flanges and said pipe, substantially as specified.

19. As a new article of manufacture, a filter member comprising a rectangular body formed of a pair of perforated plates, one of said plates being provided at its opposite sides and at one end with inturned flanges, the other plate being provided at its sides and at the end remote from the flange-provided end of the former plate with flanges projecting at substantially right angles therefrom, a connection carried by the end flange of the last mentioned plate, and means for spacing the bodies of said plates apart, substantially as specified.

In testimony whereof, I hereunto affix my signature in the presence of two witnesses.

GEORGE KNOCK.

Witnesses:
J. B. HULL,
CHAS. M. BROWN.